United States Patent
Casati et al.

(10) Patent No.: US 12,282,385 B2
(45) Date of Patent: *Apr. 22, 2025

(54) ROOT CAUSE ANALYSIS BASED ON PROCESS OPTIMIZATION DATA

(71) Applicant: ServiceNow, Inc., Santa Clara, CA (US)

(72) Inventors: Fabio Casati, Santa Clara, CA (US); Hans Jochen Gerhard Pohle, Amsterdam (NL); Sai Harini Chettla, Hyderabad (IN); Manjeet Singh, Santa Clara, CA (US); Siddhant Sinha, Hyderabad (IN)

(73) Assignee: Service Now, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,790

(22) Filed: Mar. 18, 2024

(65) Prior Publication Data

US 2024/0220352 A1    Jul. 4, 2024

Related U.S. Application Data

(63) Continuation of application No. 17/521,474, filed on Nov. 8, 2021, now Pat. No. 11,960,353.

(51) Int. Cl.
*G06F 11/07* (2006.01)
*G06F 11/34* (2006.01)
(Continued)

(52) U.S. Cl.
CPC ........ *G06F 11/079* (2013.01); *G06F 11/3476* (2013.01); *G06F 18/214* (2023.01); *G06N 20/00* (2019.01)

(58) Field of Classification Search
CPC .. G06F 11/079; G06F 11/3476; G06F 11/323; G06F 11/3466; G06F 11/3409;
(Continued)

(56) References Cited

U.S. PATENT DOCUMENTS

| 4,941,084 | A | 7/1990 | Terada et al. |
| 5,185,860 | A | 2/1993 | Wu |

(Continued)

FOREIGN PATENT DOCUMENTS

| EP | 0433979 A2 | 6/1991 |
| EP | 1607824 A2 | 12/2005 |

(Continued)

*Primary Examiner* — Matthew M Kim
*Assistant Examiner* — Matthew N Putaraksa
(74) *Attorney, Agent, or Firm* — McDonnell Boehnen Hulbert & Berghoff LLP

(57) ABSTRACT

A system for root cause analysis based on process optimization data is provided. The system receives log data associated with a first trace between a first activity and a second activity of a process. The system further determines a state of inefficiency between the first activity and the second activity based on the received log data. The system further applies a first machine learning (ML) model on the received log data. The system further determines a first label and a first value to be associated with the first trace of the process based on the application of the first ML model. The system further generates presentation data associated with the determined state of inefficiency of the first trace based on the determination of the first label and the first value and further transmits the generated presentation data on a user device.

20 Claims, 8 Drawing Sheets

(51) Int. Cl.
*G06F 18/214* (2023.01)
*G06N 20/00* (2019.01)

(58) Field of Classification Search
CPC ............. G06F 11/3477; G06F 11/3452; G06F 18/214; G06F 18/40; G06F 18/23; G06F 2201/81; G06N 20/00; G06N 3/04; G06N 7/01; G06Q 10/067; G06Q 10/0639
See application file for complete search history.

(56) References Cited

U.S. PATENT DOCUMENTS

| | | | |
|---|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller, II et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,328,260 B1 | 2/2008 | Muthiyan et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 9,069,737 B1 | 6/2015 | Kimotho et al. |
| 9,971,826 B1 | 5/2018 | Belmar |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,944,654 B2 | 3/2021 | Rimar et al. |
| 10,999,152 B1 | 5/2021 | Bar Oz et al. |
| 11,025,481 B1 | 6/2021 | Louca et al. |
| 11,089,115 B2 | 8/2021 | Garty et al. |
| 11,095,506 B1 | 8/2021 | Erblat et al. |
| 11,176,464 B1 | 11/2021 | Sagi |
| 11,275,580 B2 | 3/2022 | Tamir et al. |
| 11,277,475 B1 | 3/2022 | Tal et al. |
| 11,281,442 B1 | 3/2022 | Tal et al. |
| 11,294,666 B1 | 4/2022 | Look |
| 11,296,922 B2 | 4/2022 | Leibkowiz et al. |
| 11,301,503 B2 | 4/2022 | Burli |
| 11,379,089 B2 | 7/2022 | Goswami et al. |
| 11,451,573 B2 | 9/2022 | Waplington |
| 11,470,107 B2 | 10/2022 | Waplington |
| 11,582,106 B2 | 2/2023 | Hameiri et al. |
| 11,616,690 B2 | 3/2023 | Feiguine et al. |
| 11,630,717 B2 | 4/2023 | Vutukuru et al. |
| 11,632,303 B2 | 4/2023 | Bitterfeld et al. |
| 11,640,369 B2 | 5/2023 | Bhogle et al. |
| 11,671,444 B2 | 6/2023 | Waplington |
| 11,695,641 B2 | 7/2023 | Bar Oz et al. |
| 11,829,233 B2 | 11/2023 | Watkins et al. |
| 11,868,593 B2 | 1/2024 | Bradley et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0288053 A1 | 12/2006 | Holt et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |

(56) References Cited

U.S. PATENT DOCUMENTS

| | | |
|---|---|---|
| 2009/0228984 A1 | 9/2009 | Sterin |
| 2010/0110932 A1 | 5/2010 | Doran et al. |
| 2012/0198399 A1* | 8/2012 | Safarpour ............ G06F 30/3323 |
| | | 716/106 |
| 2013/0283273 A1 | 10/2013 | Miyazaki |
| 2014/0046735 A1 | 2/2014 | Ashikawa |
| 2014/0122427 A1 | 5/2014 | Dary |
| 2015/0135018 A1 | 5/2015 | Hotta |
| 2016/0293133 A1* | 10/2016 | Dutt ...................... G06N 3/047 |
| 2018/0123940 A1 | 5/2018 | Rimar et al. |
| 2019/0073257 A1 | 3/2019 | Dasgupta et al. |
| 2019/0089597 A1 | 3/2019 | Pathak |
| 2019/0104398 A1 | 4/2019 | Owen et al. |
| 2019/0129739 A1 | 5/2019 | Al Reza et al. |
| 2019/0149515 A1 | 5/2019 | Sharma et al. |
| 2019/0165957 A1 | 5/2019 | Abbott et al. |
| 2019/0342162 A1 | 11/2019 | Bendre et al. |
| 2020/0034462 A1 | 1/2020 | Narayanasamy et al. |
| 2020/0050689 A1 | 2/2020 | Tal et al. |
| 2020/0204443 A1 | 6/2020 | Bar Oz et al. |
| 2020/0301678 A1 | 9/2020 | Burman et al. |
| 2020/0310939 A1 | 10/2020 | Timo |
| 2021/0027205 A1 | 1/2021 | Sevakula |
| 2021/0097168 A1 | 4/2021 | Patel et al. |
| 2021/0149790 A1 | 5/2021 | Renner |
| 2021/0194764 A1 | 6/2021 | Badyan et al. |
| 2021/0281492 A1 | 9/2021 | Di Pietro |
| 2021/0287109 A1* | 9/2021 | Cmielowski ........... G06N 20/00 |
| 2021/0294717 A1 | 9/2021 | Wang |
| 2021/0306201 A1* | 9/2021 | Wang .................... H04L 41/064 |
| 2022/0156134 A1 | 5/2022 | Lehmann |
| 2022/0171800 A1 | 6/2022 | Kumaresan |
| 2022/0188705 A1 | 6/2022 | Davoodi |
| 2022/0303352 A1 | 9/2022 | Herzog et al. |
| 2023/0021373 A1* | 1/2023 | Kabbinale ............... G06F 18/24 |
| 2023/0089759 A1* | 3/2023 | Hu ...................... G06F 11/3688 |
| | | 717/124 |
| 2023/0229542 A1 | 7/2023 | Watkins et al. |
| 2024/0250885 A1* | 7/2024 | Kantal ................ H04L 41/5096 |
| 2024/0298225 A1* | 9/2024 | Hyde ................ H04W 36/0083 |
| 2024/0354220 A1* | 10/2024 | Mahajan ............. G06F 11/3612 |

FOREIGN PATENT DOCUMENTS

| | | |
|---|---|---|
| WO | 9934285 A1 | 7/1999 |
| WO | 0052559 A1 | 9/2000 |
| WO | 0179970 A1 | 10/2001 |

* cited by examiner

ROOT CAUSE ANALYSIS BASED ON PROCESS OPTIMIZATION DATA

CROSS-REFERENCE TO RELATED APPLICATIONS

This application claims priority to and the benefit of U.S. patent application Ser. No. 17/521,474, filed Nov. 8, 2021, the disclosure of which is herein incorporated by reference in its entirety.

FIELD

Various embodiments of the disclosure relate to detection of root cause for inefficiencies in a process. More specifically, various embodiments of the disclosure relate to a system and a method for root cause analysis based on process optimization data in the process.

BACKGROUND

Due to dynamic nature of an organization, the organization may have multiple processes. A process can be defined as an activity or a set of activities that can accomplish a specific organizational goal. For examples, the processes in a banking industry may be, but is not limited to, a customer on-boarding process, a credit check process, a deposit-withdrawal process, and so on. With continuous increment in a count and complexity of the processes in the organization, the organization generally creates process flows from historical data associated with the processes. The process flows may enable the organization to monitor and quickly discover inefficiencies (or other problems) within the processes. These inefficiencies may result in reputational as well as financial losses to the organizations. Once the inefficiencies are discovered, the organizations may also be interested in detection of a root cause for the inefficiencies.

Current methodology for detection of the root cause for inefficiencies may involve manual effort where the organization usually rely on human consultants who attempt to detect the root cause of the inefficiencies based on analysis of the historical data associated with the processes. This manual methodology may be time-consuming, expensive, as well as subjected to human errors. Therefore, there is required a system that may be capable to detect the root cause of the inefficiencies in the process accurately, quickly, as well as in an in-expensive manner.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for root cause analysis based on process optimization data is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
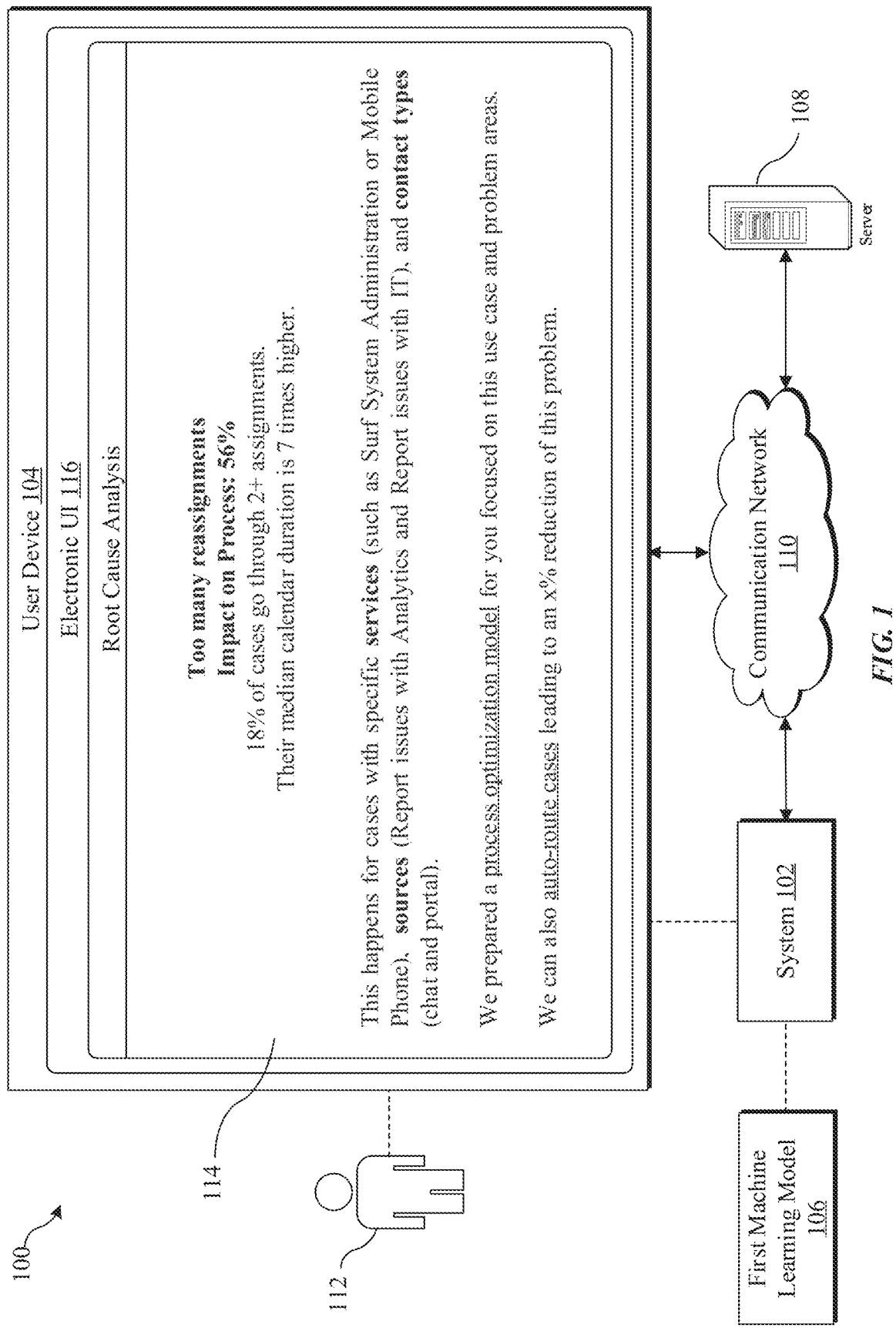
FIG. 1 is a diagram of an exemplary network environment for root cause analysis based on process optimization data, in accordance with an embodiment of the disclosure.

The following described implementations may be found in the disclosed system and method for root cause analysis based on process optimization data (or process mining data). The process mining data may be associated with a process. The process may correspond to an activity or a set of activities that may accomplish a specific organizational goal. For example, the set of activities may include (but is not limited to) a first activity and a second activity. Each activity of the set of activities may include a set of tasks that may be completed to complete the corresponding activity. The process may have a specific well-defined starting point and a specific well-defined ending point. Each process in the organization may be unique, and may have different levels of criticality, impact, and must be managed with a comprehensive life cycle.

Once the process executes, the system may record event data associated with the set of tasks or the set of activities of the process. Various organizations may analyze the recorded event data to gain various insights about the process. In some scenarios, the recorded event data may be analyzed to detect one or more inefficiencies between at least two activities (such as the first activity and the second activity) of the process. For example, the inefficiencies may correspond to additional time taken to complete certain task related to at least two activities. These inefficiencies may further incur reputational as well as financial losses to the organization.

Once the inefficiencies are detected, the organizations (or process owners within the organizations) may wish to detect the root cause behind the one or more inefficiencies. Traditional methods for detection of one or more root causes may rely on human consultants who may apply a series of pre-defined steps to detect the root cause and possibly provide one or more suggestions to overcome the one or more root causes within the process. However, these traditional manual methods for detection of the one or more root causes are time consuming, expensive, and subjected to human error as well.

The disclosed system may be configured to automatically detect the root cause for the one or more inefficiencies within the process (for example at a click of a button). The disclosed system may apply a machine learning (ML) model on log data (i.e. that may include the event data) to automatically detect one or more root causes for inefficiencies within the process. Thus, the disclosed system may detect the root cause for the inefficiencies in the processes quickly, accurately, and at lesser cost as compared to traditional methodologies. Moreover, the disclosed system may determine an impact of the inefficiencies on overall outcome of the process. Also, the disclosed system may be capable to automatically provide one or more suggestions to overcome the inefficiencies. The disclosed system may further render the detected root causes, determined impact, and the determined one or more suggestions in a natural language so that an end-user may easily understand the detected root causes, the determined impact, and the one or more suggestions quickly and effectively.

Exemplary aspects of the disclosure provide a system that may include a processor. The system may receive log data associated with a trace between a first activity and a second activity of a process. The trace may correspond to a sequence of operations executed between the first activity and the second activity of the process. The system may be further configured to determine a state of inefficiency between the first activity and the second activity based on the received log data. The system may be further configured to apply the machine learning (ML) model on the received log data based on the determined state of inefficiency. The system may be further configured to determine a label and a value to be associated with the trace of the process based on the application of the ML model. The label and the value may indicate information about a root cause for the determined state of inefficiency. The system may be further configured to generate presentation data associated with the determined state of inefficiency of the first trace based on the determination of the label and the value, and further transmit the generated presentation data to a user device.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized, and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways. Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

FIG. 1 is a diagram of an exemplary network environment for root cause analysis based on process optimization data, in accordance with an embodiment of the disclosure. With reference to FIG. 1, there is shown a block diagram of a network environment 100. The network environment 100 may include a system 102, a user device 104, a first machine learning (ML) model 106, and a server 108. The system 102 may be configured to communicate with the user device 104 and the server 108, through a communication network 110. With reference to FIG. 1, there is further shown a user 112 associated with the user device 104 and presentation data 114 that may be displayed on an electronic user interface (UI) 116 of the user device 104.

The system 102 may include suitable code, logic, circuitry, and/or interfaces that may be configured to detect root cause for inefficiency in a process. The system 102 may receive log data associated with a first trace between a first activity and a second activity of the process of an organization and further apply the first ML model 106 on the received log data. The system 102 may further determine a first label and a first value to be associated with the first trace of the process based on the application of the first ML model 106. The first label and the first value may indicate information about a root cause for a state of inefficiency between the first activity and the second activity. The system 102 may be further configured to generate the presentation data 114 associated with the determined state of inefficiency of the first trace based on the determination of the first label and the first value. The system 102 may further transmit the generated presentation data 114 to the user device 104. Examples of the system 102 may include, but are not limited to, a process optimization engine, a workstation, a laptop, a server, a cluster of servers with a management panel, a tablet, an internet-enabled device, a desktop computer, a smart phone, or any portable or non-portable device with a networking and processing capability. In some embodiments, the system 102 may store the first machine learning (ML) model 106.

The user device 104 may include suitable logic, circuitry, and interfaces that may be configured to receive the presentation data 114 and further render the received presentation data 114 on the electronic UI 116 of the user device 104. In an embodiment, the user device 104 may be further configured to transmit the log data to the system 102. The user device 104 may be associated with the user 112 of the organization. In an embodiment, the user 112 may be a process manager or a process owner of the process within the organization. Examples of the user device 104 may include, but are not limited to, a workstation, a laptop, a server, a cluster of servers with a management panel, a tablet, an internet-enabled device, a desktop computer, a mobile phone, or any portable or non-portable device with a networking, processing, and display capability.

The first machine learning (ML) model 106 may be a classifier which may be trained to identify a relationship between inputs, such as features in a training dataset and output labels, such as human defined labels. The first ML model 106 may be defined by its hyper-parameters, for example, number of weights, cost function, input size, number of layers, and the like. The hyper-parameters of the first ML model 106 may be tuned and weights may be updated so as to move towards a global minima of a cost function for the first ML model 106. After several epochs of the training on the feature information in the training dataset, the first ML model may be trained to output a prediction/classification result for a set of inputs. The prediction result may be indicative of the label for each input of the set of inputs (e.g., input features extracted from new/unseen instances).

The first ML model 106 may include electronic data, which may be implemented as, for example, a software component of an application executable on the system 102. The first ML model 106 may rely on libraries, external scripts, or other logic/instructions for execution by a processing device, such as the processor. The first ML model 106 may include code and routines configured to enable a computing device, such as the processor (of FIG. 2) to perform one or more operations for determination of the label (i.e. root cause) and a corresponding value for each trace of the process. Thus, the first ML model 106 may be trained to associate the label (and corresponding values) with different traces (i.e. indicating different problems like inefficiencies) in the process. Additionally or alternatively, the first ML model 106 may be implemented using hardware including a processor, a microprocessor (e.g., to perform or control performance of one or more operations), a field-programmable gate array (FPGA), or an application-specific integrated circuit (ASIC). Alternatively, in some embodiments, the first ML model 106 may be implemented using a combination of hardware and software.

The server 108 may include suitable logic, circuitry, and interfaces, and/or code that may be configured to store the log data. The server 108 may be further configured to train and store the first ML model 106. In some embodiments, the server 108 may be further configured to store the generated presentation data 114. The server 108 may be implemented as a cloud server and may execute operations through web applications, cloud applications, HTTP requests, repository operations, file transfer, and the like. Other example implementations of the server 108 may include, but are not limited to, a database server, a file server, a web server, a media server, an application server, a mainframe server, or a cloud computing server.

In at least one embodiment, the server 108 may be implemented as a plurality of distributed cloud-based resources by use of several technologies that are well known to those ordinarily skilled in the art. A person with ordinary skill in the art will understand that the scope of the disclosure may not be limited to the implementation of the server 108 and the system 102 as two separate entities. In certain embodiments, the functionalities of the server 108 can be incorporated in its entirety or at least partially in the system 102, without a departure from the scope of the disclosure.

The communication network 110 may represent a portion of the global Internet. However, the communication network 110 may alternatively represent different types of network, such as a private wide-area or local-area packet-switched networks. The communication network 110 may include a communication medium through which the system 102, the user device 104, and the server 108 may communicate with each other. The communication network 110 may be one of a wired connection or a wireless connection. Examples of the communication network 110 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT)® communication protocols.

In operation, the system 102 may be configured to receive log data associated with the first trace (i.e. sequence of related operations or steps) between the first activity and the second activity of the process. The received log data may include a first set of records, a first set of logs, and a first set of user events associated with the first trace between the first activity and the second activity. Based on the reception of the log data, the system 102 may be configured to determine a state of inefficiency between the first activity and the second activity of the process or the state of inefficiency in the first trace. The determine state of inefficiency may be potential candidate for delays, reputational losses, as well as financial losses incurred by an organization associated with the process. The state of inefficiency between the first activity and the second activity of the process may be determined based on a plurality of criteria. Details about the determination of the state of inefficiency are provided, for example, in FIG. 3.

The system 102 may be further configured to apply the first ML model 106 on the received log data based on the determined state of inefficiency. Based on the application of the first ML model 106 on the received log data, the system 102 may be configured to determine a first label and a first value to be associated with the first trace of the process. The first label and the first value may indicate information about a root cause for the determined state of inefficiency between the first activity and the second activity. Details about the application of the first ML model 106 on the log data are provided, for example, in FIG. 5 and FIG. 6.

The system 102 may be further configured to generate the presentation data 114 associated with the determined state of inefficiency of the first trace based on the determination of the first label and the first value. The generated presentation data 114 may include one or more root causes for the determined state of inefficiency between the first activity and the second activity and an impact of the inefficiency on the process. The generated presentation data 114 may further include one or more suggestions to overcome the inefficiency between the first activity and the second activity. The system 102 may be further configured to transmit the generated presentation data 114 to the user device 104. The system 102 may further control the user device 104 to render the generated presentation data 114 for the user 112. Details about the presentation data 114 are provided, for example, in FIG. 7. It may be noted that the presentation data 114 (i.e. indicating the inefficiencies between activities, root causes (like "reassignments"), impacts, and suggestions) shown in FIG. 1 is merely an example. Based on type of process of the organization, the presentation data 114 may vary, without any deviation from the scope of the disclosure.

Figure 2:
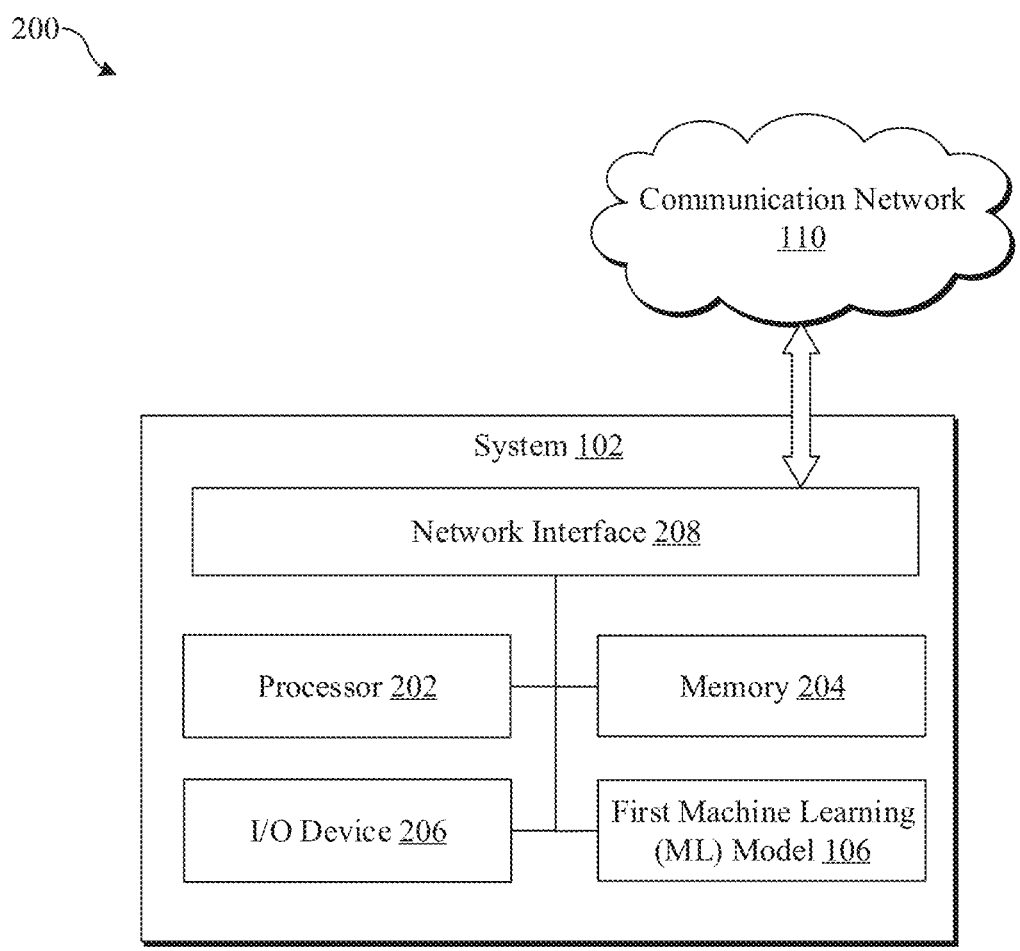
FIG. 2 is a block diagram of a system for root cause analysis based on process optimization data, in accordance with an embodiment of the disclosure.

FIG. 2 is a block diagram of a system for root cause analysis based on process optimization data, in accordance with an embodiment of the disclosure. FIG. 2 is explained in conjunction with elements from FIG. 1. With reference to FIG. 2, there is shown a block diagram 200 of the system 102. The system 102 may include processor 202, a memory 204, an input/output (I/O) device 206, and a network interface 208. In some embodiments, the system 102 may communicate with the user device 104 and the server 108, via the network interface 208. In some other embodiments, the system 102 may include the first ML model 106 (for example in the memory 204).

The processor 202 may include suitable logic, circuitry, and/or interfaces that may be configured to execute instructions for root cause analysis based on process optimization data. The operations for the root cause analysis may include, but are not limited to, reception of the log data of activities, determination of state of inefficiencies in the activities, application of the first ML model 106, determination of the labels/values for the root causes, or the generation of the presentation data. Examples of implementation of the processor 202 may include a Central Processing Unit (CPU), x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), co-processors, other processors, and/or a combination thereof.

The memory 204 may include suitable logic, circuitry, code, and/or interfaces that may be configured to store the instructions executable by the processor 202. The memory 204 may store the received log data, one or more rules to determine the inefficiency, the presentation data 114, first set of records of the log data, estimated odds ratio, and impact scores. In some embodiments, the memory 204 may be configured to store the first ML model 106. Examples of implementation of the memory 204 may include, but are not limited to, Random Access Memory (RAM), Read Only Memory (ROM), Hard Disk Drive (HDD), and/or a Secure Digital (SD) card.

The I/O device 206 may include suitable logic, circuitry, and/or interfaces that may be configured to receive an input and provide an output based on the received input. The I/O device 206 may include various input and output devices, which may be configured to communicate with the processor 202. Examples of the I/O device 206 may include, but are not limited to, a touch screen, a keyboard, a mouse, a joystick, a display device, a microphone, or a speaker.

The network interface 208 may include suitable logic, circuitry, interfaces, and/or code that may be configured to enable communication between the system 102, the user device 104, and the server 108 via one or more communication networks including the communication network 110. The network interface 208 may implement known technologies to support wired or wireless communication with the one or more communication networks. The network interface 208 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 208 may communicate via wireless communication with networks, such as the Internet, an Intranet, and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n), voice over Internet Protocol (VOIP), Wi-MAX, a protocol for email, instant messaging, and/or Short Message Service (SMS).

Similar to the system 102, the user device 104 (though not shown in FIG. 2) may include one or more components including, but not limited to, processor, a memory, a I/O device, and a network interface with similar functions. The functions or operations executed by the system 102, as described in FIGS. 1, 3, 4, 5, 6, 7 and 8, may be performed by the processor 202.

Figure 3:
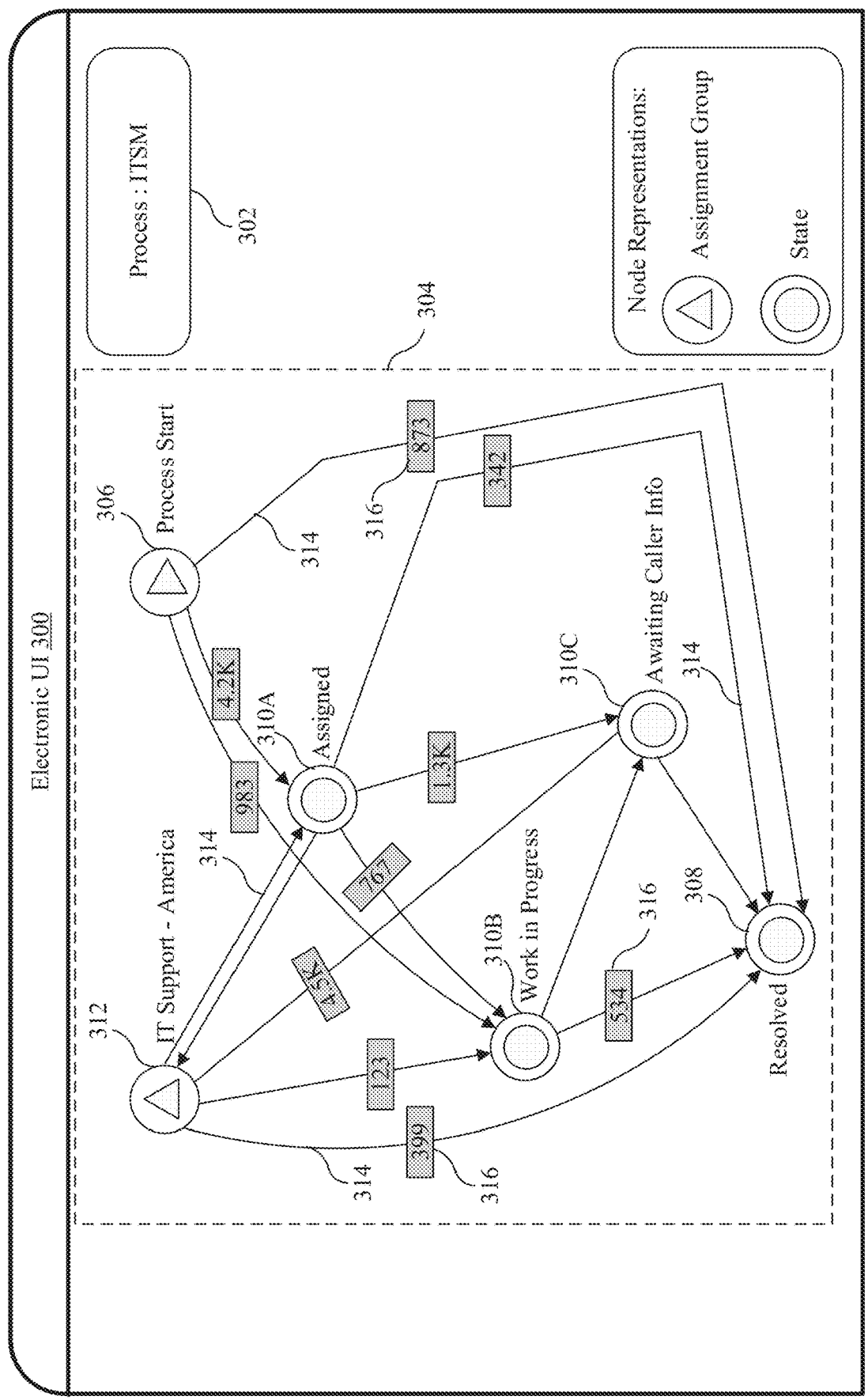
FIG. 3 is a diagram that depicts an exemplary flow map of a process, in accordance with an embodiment of the disclosure.

FIG. 3 is a diagram that depicts an exemplary flow map of a process, in accordance with an embodiment of the disclosure. FIG. 3 is explained in conjunction with elements from FIG. 1, and FIG. 2. With reference to FIG. 3, there is shown an exemplary electronic UI 300 that may display an exemplary flow map of a process (for example, but not limited to, an Information technology service management (ITSM) process). With reference to FIG. 3, there is shown a first UI element 302 that depicts a name of the ITSM process and a flow map 304 that depicts an execution workflow of the ITSM process.

To visualize the flow map 304, the system 102 may be configured to receive a user input to create a process model definition associated with the ITSM process. The received user input may include, but is not limited to, a name of the process, a source table for extraction of historical data of the workflow of the ITSM process, and one or more data filters to be applied on data stored in the source table to extract the historical data. In an embodiment, the historical data may correspond to audit logs associated with a plurality of historical traces of the ITSM process. Based on the reception of the first input, the system 102 may be configured to generate the flow map 304 associated with the execution workflow of the ITSM process. Specifically, the system 102 may apply a mining engine or a mining algorithm on the historical data to generate the flow map 304. In an embodiment, the generated flow map 304 may correspond to process mining data or process optimization data associated with the process (for example the ITSM process).

The flow map 304 may show a life cycle of the execution workflow of the ITSM process. Within the flow map 304, there is further shown a first node 306 and a final node 308 of the ITSM process. The first node 306 may correspond to a "start" state of the ITSM process and the final node 308 may correspond to a "resolved" state (or a final state) of the ITSM process. Between the first node 306 and the final node 308, there is further shown a set of intermediate nodes such as, but not limited to, a first intermediate node 310A, a second intermediate node 310B, and a third intermediate node 310C. For example, the first intermediate node 310A may correspond to an "assigned" state, the second intermediate node 310B may correspond to a "Work in Progress" state, and the third intermediate node 310C may correspond to a "Awaiting Caller Info" state. With reference to FIG. 3, there is further shown a second node 312 that may represent an assignment group, such as (but not limited to) "IT Support—America" assignment group. There is further shown a set of directional arrows 314 connected to at least two nodes of the first node 306, the final node 308, the set of intermediate nodes, and the second node 312. Each of the set of directional arrows 314 may represent a flow (or a state transition) within the process. Each of the set directional arrows 314 may represent a numerical value 316 that may depict a count of state transitions between the two nodes connected by the corresponding arrow. For example, as shown in FIG. 3, the numerical value "399" may indicate that the state of the 399 number of traces of the process have been transitioned to "resolved" state by the "IT Support—America" assignment group. In an embodiment, the first node 306, the final node 308, and each of the set of intermediate nodes, may represent an activity of the process. As another example, the numerical value "4.2K" may indicate that that 4200 number of traces have been transitioned from "Process Start" state to "Assigned" state. As discussed above, the trace may correspond to a sequence of operations that may be executed between the first activity (i.e. the "Process Start" state) and the second activity (i.e. "Assigned" state) of the process. In an embodiment, the sequence of operations may be included in the first activity and/or in the second activity. As an example, the sequence of operations executed between the "Process start" state and the "Assigned State" for an IT ticket (i.e. raised by an employee of the organization) may include, but not limited to, reception of an IT ticket from the employee, storing the content of the IT ticket in a table, determination of a category of IT ticket, determination of one or more agents capable of handling the IT ticket, determination of an agent who is available to work on the IT ticket, updating the allocation table associated with the IT ticket, and the like.

With reference to the flow map 304 and as an example, an IT ticket may be raised by an employee of the organization at time T1. At the time T1, the IT ticket may be at the "start" state (at the first node 306). At time T2, the IT ticket may be assigned to "IT Support—America" assignment group (at the second node 312) and the state of the ticket may be changed from the "start" state to the "assigned" state (at the first intermediate node 310A). Once an agent (i.e. assigned executive), from the to "IT Support—America" assignment group, picks up the raised IT ticket, the state of the ticket may be changed from the "assigned" state to the "Work in Progress" state (at the second intermediate node 310B). In some embodiments, the IT ticket may be resolved by the agent and the state of the IT ticket may be changed to the "resolved" state. In certain situations, the agent may require some additional information from the employee who raised the IT ticket. In such a scenario, the state of the IT ticket may be changed to "Awaiting Caller Info" state (at the third intermediate node 310C). Once the employee provides the required additional information, the state of the IT ticket may change to the "Work in Progress" state (at the second intermediate node 310B) and then to "Resolved" state after the agent resolves a problem mentioned in the raised IT ticket.

In an embodiment, the system 102 may be configured to render one or more metrics associated with the state transition. In an embodiment, the system 102 may be configured to receive a user input corresponding to selection of a first arrow from the set of directional arrows. Based on the selection of the first arrow, the system 102 may be configured to render the one or more metrics associated with the state transition. The one or more metrics may include, but are not limited to, a count of total occurrences, a count of unique occurrence, an average transition time, a minimum transition time, a maximum transition time and the like. As an example, the one or more metrics associated with the state transition from "IT Support—America" assignment group to "Resolved" state (i.e. final state) may indicate that the count of total occurrences of tickets from the "IT Support—America" assignment group to the "Resolved" state may be "315", the count of unique occurrences of tickets from the "IT Support— America" assignment group to the "Resolved" state may be "315", the average transition time of tickets from the "IT Support—America" assignment group to the "Resolved" state may be "21" hours, the minimum transition time of tickets from the "IT Support—Americas" assignment group to the "Resolved" state may be "2" hours, and the maximum transition time of tickets from the "IT Support—America" assignment group to the "Resolved" state may be "2" days.

In an embodiment, the one or more metrics may indicate the state of inefficiency between the first activity (or state) and the second activity (or state) of the process. For example, the average transition time of tickets from the "IT Support—America" assignment group to the "Resolved" state being "21" hours may correspond to a state of inefficiency between the "IT Support—America" assignment group and the "Resolved" state, considering an expected average transition time (for example "15" hours) may be lesser than the actual average transition time (i.e. "21" hours). It may be noted that one or more metrics (such as count of total occurrences of tickets) shown in FIG. 3 are merely presented as example. The flow map 304 of different types of processes may indicate various types of metrics, without any deviation from the scope of the disclosure. Different types of metrics may indicate different types of problems/issues (like state of inefficiency) for different processes.

In an embodiment, the exemplary flow map of the process (as shown in FIG. 3 for example) may render a user interface (UI) element (such as a UI button) for root cause analysis, along with the one or more metrics. Based on the selection of the UI element, the system 102 may be configured to determine the root cause for the corresponding problem/issue (such as state of inefficiency) between different activities/states (for example the "IT Support—America" assignment group and the "Resolved" state) by an application of the first ML model 106 on the traces associated with the activities/states (for example "IT Support—America" assignment group to the "Resolved" state). The traces may correspond to the sequence of operations (or steps or communications) for different IT tickets (or for other tasks) between different activities/states (i.e. IT Support—America" assignment group and "Resolved" state as shown, for example, in FIG. 3) in a particular period of time (for example in last certain hours, days, weeks, months, or years).

Figure 4:
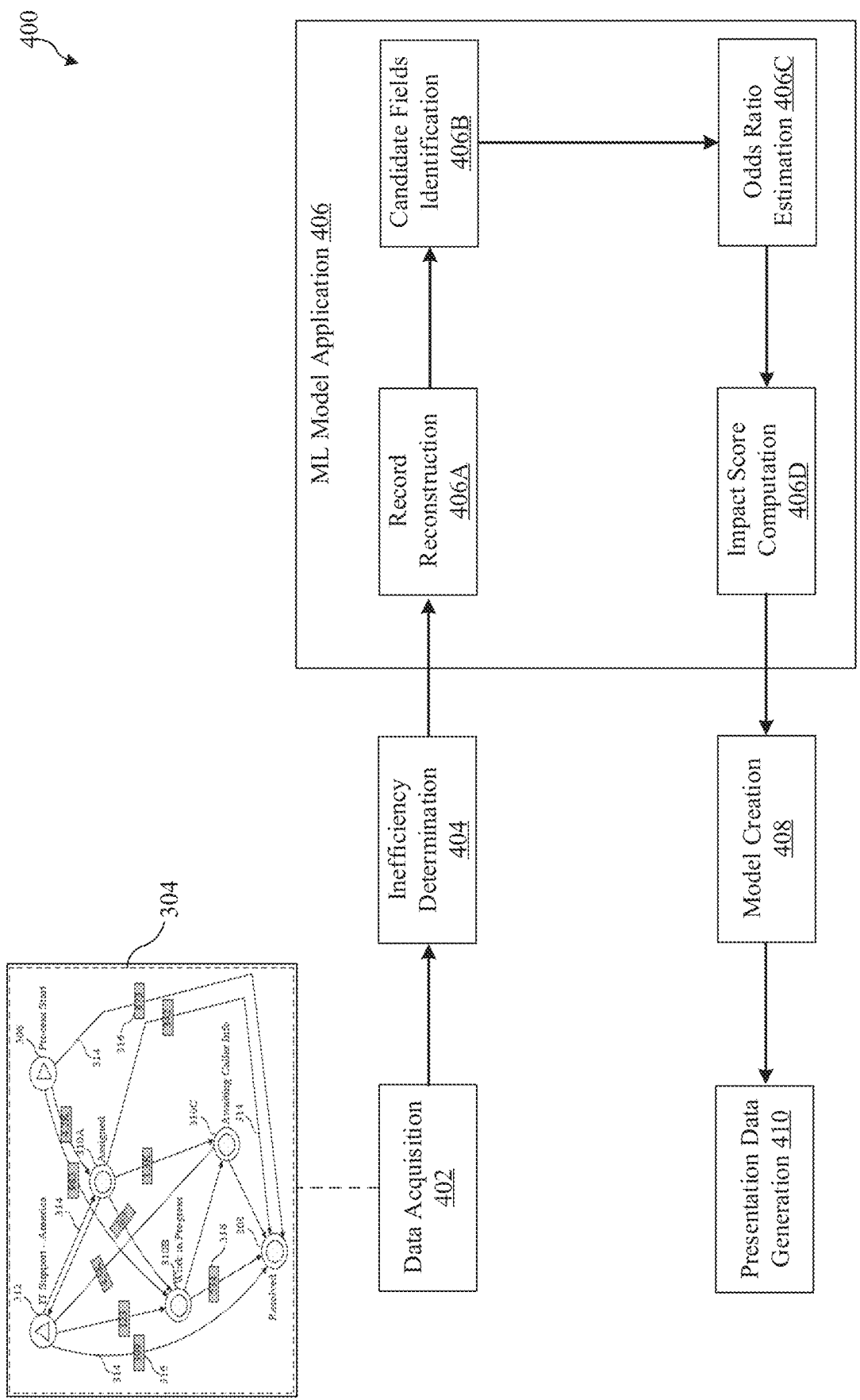
FIG. 4 depicts a block diagram that illustrates a set of operations for root cause analysis based on process optimization data, in accordance with an embodiment of the disclosure.

FIG. 4 depicts a block diagram that illustrates a set of operations for root cause analysis based on process optimization data, in accordance with an embodiment of the disclosure. FIG. 4 is explained in conjunction with elements from FIG. 1, FIG. 2, and FIG. 3. With reference to FIG. 4, there is shown a block diagram 400 of a set of exemplary operations from 402 to 410. The exemplary operations illustrated in the block diagram 400 may be performed by any system, such as by the system 102 of FIG. 1 or by the processor 202 of FIG. 2. In an embodiment, a first set of operations (such as operations at 402 404, 408, and 410) of the exemplary operations may be performed by the system 102 of FIG. 1 and a second set of operations (such as operations at 406A, 406B, 406C, and 406D) of the exemplary operations may be performed by the first ML model 106 of FIG. 1. In an embodiment, the first ML model 106 may be included or stored in the system 102.

At 402, a data acquisition operation may be executed. In the data acquisition operation, the processor 202 may be configured to receive log data associated with a first trace between a first activity (or a first state) and a second activity (or a second state) of the process. The log data may be received from a plurality of data sources. In an embodiment, the system 102 may be configured to receive a first user input from the user 112, via the user device 104. The received first user input may correspond to a selection of one or more data sources (for example the server 108) from the plurality of data sources. Each of the plurality of data sources may store log data associated with the one or more historical traces of the first activity and the second activity (or multiple activities) of the process. In some embodiments, the log data associated with the historical traces of the first activity and the second activity may be stored in the memory 204 of the system 102.

Based on the reception of the first user input, the processor 202 may be configured to transmit a data acquisition request to the one or more data sources. The data acquisition request may correspond to a request for the retrieval of the log data from the one or more data sources. In an embodiment, the data acquisition request may include a first trace identifier, a first activity identifier, and a second activity identifier to retrieve the log data associated with the first trace between the first activity and the second activity of the process. Based on the transmission of the data acquisition request, the system 102 may be further configured to receive the log data, associated with the first trace, from the one or more data sources. In an embodiment, the system 102 may be configured to receive the log data based on a selection of a directional arrow (such as the direction arrow 314) in the flow map 304. As an example, the system 102 may receive a user input for selection of the directional arrow 314 between the "IT Support—America" assignment group node and the "Resolved" node. The system 102 may further receive the log data associated with the first execution trace between the "IT Support—America" assignment group node and the "Resolved" node.

In an embodiment, a trace may be defined as a partially ordered set of steps or events (or a sequence of operations or events) that may be characterized by the step or event name, a start/end time of the step/event and a duration of the step/event. Each trace of the process may have a same process identifier and a trace identifier. In another embodiment, the process may be an incident and the associated trace within the process may be considered as a lifecycle of one incident.

The received log data may include, but is not limited to, a first set of records, a first set of logs, and a first set of user events associated with the first trace between the first activity and the second activity. In an embodiment, the first set of records may include the first set of logs, and the first set of user events associated with the first trace between the first activity and the second activity. In an embodiment, the first set of user events may indicate user-related operations in the process (such as data inputs, clicks for any particular operation in the process, like ticket assignment, ticket approval, ticket rejection, ticket closure, etc in the ITSM process), and the first set of logs may include audit logs (or event logs) associated with the first activity and the second activity of the process. In an embodiment, each of the set of records may correspond to an incident (or a support request or a support ticket) and may have one or more data fields (or attributes). Each record may be generated when the incident (or a support request) may be raised by an employee of an organization.

In an embodiment, the received first user input may correspond to selection of a first arrow (as shown in FIG. 4 at 304) of the set of directional arrows 314 displayed on the flow map 304. Based on the selection of the first arrow of the set of directional arrows 314, the system 102 may be configured to determine the first activity as the activity from where the first arrow initiates (like from the "IT Support—America" assignment group node shown in FIG. 3) and the second activity as the activity where the first arrow terminates (like the "Resolved" node shown in FIG. 3).

At 404, an inefficiency determination operation may be performed. In the inefficiency determination operation, the system 102 may be configured to determine a state of inefficiency between the first activity and the second activity of the process. The state of inefficiency between the first activity and the second activity may be determined based on a plurality of criteria related to, but not limited to, a time period, a loop count, a state transition count, and a re-assignment count. For example, if the time taken between the first activity and the second activity of the process is greater than a threshold time period, then the state of inefficiency may be determined between the first activity and the second activity. As another example, if the process loops back to same activity for a number of times greater than a threshold count, then the state of inefficiency may be determined between the first activity and the second activity. As another example, if the process goes back to the first activity after the second activity for a number of times greater than a threshold state transition count, then the state of inefficiency may be determined between the first activity and the second activity. Similarly, if the process flow is being assigned to same assignment group for a number of times greater than a threshold re-assignment count, then the state of inefficiency may be determined between the first activity and the second activity.

In an embodiment, the system 102 may be configured to apply one or more rules on the received log data. The one or more rules may be associated with the plurality of criteria. Specifically, the one or more rules may implement the plurality of criteria. The system 102 may be further configured to determine the state of inefficiency between the first activity and the second activity based on the application of the one or more rules on the received log data.

At 406, a ML model application operation may be executed. In the ML model application operation, the system 102 may be configured to apply the first ML model 106 on the received log data. The first ML model 106 may be applied on the log data to determine a first label and a first value (i.e. or classes) to be associated with the first trace of the process. The first label and the first value may indicate information about a root cause for the determined state of inefficiency associated with the first trace of the process. For example, the first trace may relate to sequence of operations (tasks, events, or communication) between the first activity (like from the "IT Support—America" assignment group node shown in FIG. 3) and the second activity (like the "Resolved" node shown in FIG. 3). By way of example and not limitation, the first label may be "reassignment reason" (i.e. root cause for the inefficiency due to the reassignment of raised ticket/task from one worker to another worker) and the first value may be, but not limited to, "wrong assignment", "reassignment due to worker unavailability", reassignment due to escalation", or "reassignment to be able to work 24/7 time". Therefore, the root cause of the inefficiency between the first activity and the second activity may be wrong re-assignments of the raised IT ticket. The first ML model 106 may be trained to indicate an association (or mapping) between different labels/values (i.e. root causes) and different traces (i.e. indicating different problems like state of inefficiency) of the process. The training of the first ML model 106 on the association between the labels/values and the traces of the process is described, for example, in FIG. 6. The ML model application operation may include 4 sub-operations such as a record reconstruction operation, a candidate fields identification operation, an odds ratio estimation operation, and an impact score computation operation to determine the first label and the first value for the determine state of inefficiency for the first trace of the process.

At 406A, a record reconstruction sub-operation may be performed. In the record reconstruction sub-operation, the system 102 may be configured to reconstruct a first set of records from the received log data. Each of the first set of records may correspond to an incident or a support request (like a request for IT support) associated with a trace (like the first trace) of the process. Specifically, the system 102 may be configured to reconstruct values of each of one or more fields of the first set of records at an initiation of the records. The system 102 may be configured to analyze the received log data to determine or reconstruct the values of each of the first set of records. In an embodiment, the system 102 may be configured to reconstruct the values of each of the first set of records to determine a causal correlation between the values and the determined state of inefficiency (i.e. an outcome) of the process before the outcome materializes. In some embodiments, the system 102 may be configured to control the first ML model 106 to reconstruct the first set of records from the received log data.

In an embodiment, the one or more fields associated with each of the reconstructed first set of records may include, but not limited to, an assignment group filed, a service field, an assigned-to field, a category field, a sub-category field, a service offering field, a state field, a caller field, a priority field, an update field, an updated by field, as short description field, an active field, an activity due field, an actual ended field, an actual start field, an additional assignee field, an additional comments field, an approval field, an approval history field, an approval set field, a duration field, a resolve time field, a caused by change field, a change request field, a number field, a opened field, and the like. In an embodiment, values for each of the one or more fields may be filled by the employee who raises or initiates the incident or request (for example at the first node 306 shown in FIG. 3). In another embodiment, values for a set of fields out of the total fields may be provided by the employee. In such scenario, the system 102 or the first ML model 106 may automatically determine the values for each of the leftover or remaining fields. In an embodiment, the system 102 may be further configured to select the one or more fields during a set-up phase based on a user input received from the user 112. In another embodiment, the system 102 may be configured to select one or more hidden fields (latent variables) that may not be selected by the user 112, but may be potential root cause for the determined state of inefficiency.

At 406B, a candidate fields identification sub-operation may be performed. In the candidate fields identification sub-operation, the system 102 may be configured to (or control the first ML model 106) to identify a first set of candidate fields. Based on the reconstruction of the first set of records, the system 102 may be configured to identify the first set of candidate fields from the reconstructed first set of records. Each of the identified first set of candidate fields may correspond to a field whose value may have the causal correlation with the outcome (i.e. state of inefficiency). A first value of a first candidate field of the first set of candidate fields may have the causal correlation with the outcome because an existence of the first value causes or impacts the outcome. In an embodiment, the system 102 may be configured to filter-out (or discards) fields that may not have categorical values and the fields whose values may be blank to identify the first set of candidate fields. In an embodiment, a categorical value may be associated with a categorical field. The categorical field may have a distinct value (for example either yes or no, good or bad, etc.) and may not have a numerical value (like "100", "200", etc.) or a constant value (like value for a name of the process, value for a type of the process, etc.). Alternatively, the categorical value may belong to (or correspond to) a particular category. This may be done because the fields that may not have categorical values and the fields whose values are blank, may not have impact on the outcome of the process. Each of the identified first set of candidate fields may be potential root cause for the inefficiency between the first activity and the second activity. The identified set of candidate fields may be categorical (for example based on the number of distinct values).

In an embodiment, the identified set of candidate fields may include the assignment group filed, the service field, the assigned-to field, the category field, the state field, the additional assignee field, the additional comments field, the approval field, the approval history field, the approval set field, the service offering field, the short description field, and the like. In another embodiment, the identified set of candidate fields may further include the one or more hidden fields (latent variables) also.

In an embodiment, each of the identified first set of candidate fields may be a potential candidate for the first label (i.e. root cause) to be associated with the first trace. The system 102 may be further configured to determine the values for each of the first set of candidate fields that may lead or impact to the outcome. The value of each field of each of the reconstructed first set of records may be stored in the memory 204. The first value associated with the first label may be from the stored values of each field of each of the reconstructed first set of records.

At 406C, an odds ratio estimation sub-operation may be performed. In the odds ratio estimation sub-operation, the system 102 may be configured to (or control the first ML model 106 to) estimate an odds ratio associated with each value of the identified set of candidate fields and the outcome. Generally, the odds ratio ("OR") corresponds to a measure of association between an exposure and the outcome. The "OR" may represent the odds that the outcome will occur given a particular exposure (i.e. a first value of a first candidate field), compared to the odds of the outcome occurring in the absence of that particular exposure. The "OR" may be estimated by equation (1), as follows:

$$"OR" = \frac{a/c}{b/d} = \frac{ad}{bc} \quad (1)$$

Where,
"a"=Number of exposed cases, wherein the number of exposed cases corresponds to a number of records with outcome as "the state of inefficiency" where the value of the first candidate field is the first value,
"b"=Number of exposed non-cases, wherein the number of exposed non-cases corresponds to a number of records with outcome as "the state of inefficiency" where the value of the first candidate field is different than the first value,
"c"=Number of unexposed cases, wherein the number of unexposed cases corresponds to a number of records with outcome as "Efficient" or "Sate of Efficiency" where the value of the first candidate field is the first value, and "d"=Number of unexposed non-cases, wherein the number of unexposed non-cases corresponds to a number of records with outcome as "Efficient" or "Sate of Efficiency" where the value of the first candidate field is different than the first value.

The system 102 may further store the estimated odds ratio for every value of each candidate field of each reconstructed first set of records. For example, if the first candidate field (say "category") have two different values like, a first value being "forgotten password" and a second value being "forgotten username", the first ML model 106 or the system 102 may be configured to estimate the odds ratio for both the first value and the second value (i.e. "forgotten password" and "forgotten username") for the candidate field "category". The estimated odds ratio may be used to compute an impact score as described below.

At 406D, an impact score computation sub-operation may be performed. In the impact score computation sub-operation, the system 102 (or the first ML model 106) may be configured to compute an impact score of each of the identified first set of candidate fields. In an embodiment, the impact score may be computed based on the estimated odds ratio. By way of example and not limitation, the system 102 may be configured to compute the impact score based on multiplication of the odds ratio and a number of records that have co-relation with the outcome. The number of records that have the co-relation with the outcome may correspond to the records that results into the state of inefficiency for the process. The system 102 may be further configured to sort the identified first set of candidate fields based on the corresponding computed impact score, to generate a sorted list of the first set of candidate fields. The sorted list may be further transmitted to the user device 104. In an embodiment, a first field on the top of the sorted list may be the first label to be associated with the first trace of the process. The system 102 may further determine the first value to be associated with the first label based on the stored odds ratio. Specifically, the system 102 may determine the first value, as the value corresponding to the first label, that may have the maximum impact on the outcome. By way of example and not limitation, the first label may be "reassignment reason" (i.e. root cause) and the first value may be "wrong assignment". Therefore, the root cause of the inefficiency between the first activity and the second activity may be wrong re-assignments of the raised IT ticket (or any other request which requires assignment in the process).

At 408, a model creation operation may be performed. In the model creation operation, the system 102 may be configured to create a process optimization model. The system 102 may be configured to create the process optimization model based on the computed impact score for each of the identified first set of candidate fields. The process optimization model may include one or more nodes or breakdown fields that have many conditions present in the sorted list. For example, if "category=password reset" and "category=laptop" have a high impact score, then the system 102 may be configured to create the process optimization model that may focus on "category" field as the breakdown field. The system 102 may be further configured to generate a flow map (similar to the flow map 304) that may be focused on different values associated with the "category" field.

At 410, presentation data generation operation may be performed. In the presentation data generation operation, the system 102 may be configured to generate the presentation data 114 associated with the determined state of inefficiency of the first trace based on the determination of the first label and the first value. The system 102 may be further configured to transmit the generated presentation data 114 on the user device 104. In an embodiment, the generated presentation data 114 may be transmitted to the user device 104 for rendering of the generated presentation data 114 on the user device 104. Details about the generated presentation data are provided, for example, in FIG. 7.

Thus, the system 102 (using the first ML model 106) may be configured to automatically detect one or more root causes for inefficiencies within the process (for example just based on an input, such as a click of a button). In some embodiments, the detection of the root causes may be trigged automatically (for example at a predefined schedule time, like once in a week or a month). The system 102 may further generate the presentation data associated with the inefficiencies of the first trace based on the determination of the first label and the first value related to the detected root cause. Moreover, the system 102 may also generate one or more suggestions to overcome the inefficiencies within the process (as described, for example, in FIG. 7). Thus, the disclosed system may detect the root cause for the inefficiencies in the processes quickly, accurately, and at lesser cost as compared to traditional human-based methodologies.

Figure 5:
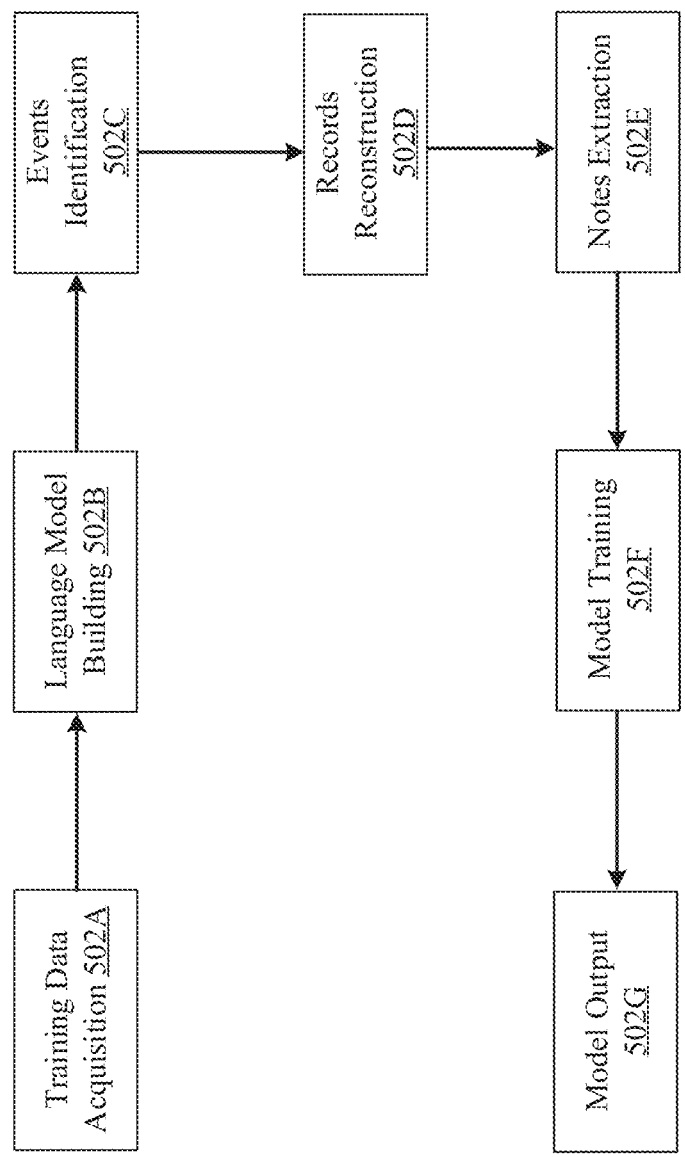
FIG. 5 depicts a block diagram that illustrates a first set of operations for training of a first ML model, in accordance with an embodiment of the disclosure.

FIG. 5 depicts a block diagram that illustrates a first set of operations for training of the first ML model, in accordance with an embodiment of the disclosure. FIG. 5 is explained in conjunction with elements from FIG. 1, FIG. 2, FIG. 3, and FIG. 4. With reference to FIG. 5, there is shown a block diagram 500 of a set of exemplary operations from 502A to 502G. The exemplary operations illustrated in the block diagram 500 may be performed by any system, such as by the system 102 of FIG. 1 or by the processor 202 of FIG. 2.

At 502A, a training data acquisition operation may be performed. In the training data acquisition operation, the system 102 may be configured to receive a training dataset. The training dataset may be received from the user 112 via the user device 104 and may include a set of training records, a set of training logs, and a set of user events associated with the process. In another embodiment, the training dataset may be received from the server 108 related to the process. As discussed above, each record of the set of training records may be associated with an incident or a service request or a support ticket that may be raised by an employee of the organization (including the process) and may include a plurality of fields (or attributes). The received log data correspond to event logs (or audit logs) associated with an execution workflow of the process. The set of user events may be associated with user events and user context.

At 502B, a language model building operation may be executed. In the language model building operation, the system 102 may be configured to build a language model. The language model may be a probability distribution over words or word sequence. In other words, the language model may be able to predict a next word or words in the word sequence based on one or more preceding words in the word sequence. The language model may be used to detect the root cause for the outcome (i.e. the state of inefficiency) in a natural language and present the same to the user 112. The language models may interpret the word sequence by feeding the word sequence through one or more algorithms that may be responsible for creation of rules for the context in a natural language. These language model may be built for the prediction of words by learning the features and characteristics of a language. With the learning, the language model may prepare itself for understanding phrases and predicting the next words in word sequence. Examples of different types of language models may include, but are not limited to, a statistical language model, and neural language model. The statistical language models may use traditional statistical techniques such as N-gram, hidden markov models (HMM) and linguistic rules to learn the probability of distribution of the words. The neural language model may use one or more neural networks to learn the probability of distribution of the words. Examples of statistical language models may include, but are not limited to, a N-Gram model, a Unigram model, a Bidirectional model, an Exponential model, and a continuous space model.

At 502C, an events identification operation may be performed. In the events identification operation, the system 102 may be configured to identify one or more first events of interest from the received training dataset. The one or more first events of interest may be related to the inefficiency between the first activity and the second activity. In an embodiment, the system 102 may be configured to determine the one or more first events of interest associated with each potential root cause of the inefficiency between the first activity and the second activity of the process. As a first example and not limitation, to identify traces with too many reassignments from agent to agent (or from one assignment group to another assignment group) that may be potential sign of the inefficiency, the root cause for "too many reassignments" may have to be identified. The system 102 may be configured to identify one or more traces that may be inefficient due to "too many reassignments" and further identify the one or more first events of interest that may lead to the inefficiency. As an example, the one or more first events may include, but are not limited to, missing information in the record from the employee, rejection of a request by a manager, the manager being on leave and no other person than the manager may have an authority to approve the request, request routing between two or more assignment groups (or agents) for gathering of the missing information. In another embodiment, the system 102 may be further configured to analyze each of one or more first events to identify the patterns of identified traces that may led to the state of inefficiency in the process.

At 502D, a records reconstruction operation may be performed. In the records reconstruction operation, the system 102 may be configured to reconstruct a second set of records (i.e. from the first set of records) associated with each of the identified one or more first events of interest. Specifically, the system 102 may be configured to reconstruct a trace of the process based on analysis of a set of records, and a set of logs associated with each of the identified one or more first events. The reconstructed second set of records may correspond to the state of inefficiency as identified as the one or more first events of interest. In an embodiment, the system 102 may be configured to determine the value of one or more fields associated with each trace of the process. In an embodiment, each of the set of records may correspond to an incident or a support request (like a request for IT support) associated with the process. Specifically, the system 102 may be configured to reconstruct values of each of one or more fields of the second set of records at an initiation of the records that may have led to the state of inefficiency in the process. For example, a value of a first field of the record was 'A' at the time of the initiation of the record, but at a current time (i.e. after the execution of any activity of the process), the value of the first record is 'B'. The system 102 may be configured to identify the value of the field during the execution of the process.

At 502E, a notes extraction operation may be performed. In the notes extraction operation, the system 102 may be configured to extract one or more notes associated with each of the reconstructed second set of records. Specifically, the system 102 may be configured to extract a first conversation between one or more agents (like an IT team worker), and a second conversation between an agent and the employee of the organization. The system 102 may be further configured to reconstruct a thread of conversations from the extracted first conversation and the extracted second conversation. The thread of conversations may correspond to the one or more notes associated with each of the reconstructed second set of records. The system 102 may be further configured to determine a potential cause for "too many reassignments" based on the reconstructed thread of conversations (or the extracted one or more notes).

In an embodiment, the system 102 may be configured to analyze the identified events of interest, the reconstructed second set of records, the extracted first conversation, and the extracted second conversation to identify patterns of interest that may lead to outcome (i.e. state of inefficiency). In an embodiment, the system 102 may be configured to analyze the identified events of interest, the reconstructed second set of records, the extracted first conversation, and the extracted second conversation using the built language model. In some embodiments, the potential fields for the root cause may not be present in the reconstructed traces of the second set of records (and the one or more fields) that may be reconstructed at 502D. With reference to the first example, suppose the reason for "too many reassignments" may be assignment to the wrong person but there may be no fields indicating the assignment to the wrong person. In such case, the system 102 may be configured to generate a new field (or new categorical field) with label called "assignment correctness" with value either "yes" or "no". Such new field may be generated by the language model based on the analysis of the identified events of interest, the reconstructed second set of records, the extracted first conversation, and the extracted second conversation. In some embodiments, these new fields may be referred as latent dimensions or latent variable or hidden variables because these fields may not be present in the one or more fields but may be the potential candidate for the inefficiency of the process.

At 502F, a model training operation may be performed. In the model operation, the system 102 may be configured to train the first ML model 106. Specifically, the system 102 may be configured to apply the first ML model 106 on at least one of the reconstructed second set of records or the extracted one or more notes, and determine a first output based on the application of the first ML model 106 on at least one of the reconstructed second set of records or the extracted one or more notes. The first output may correspond to one or more labels and one or more values for the one or more first events of interest. The system 102 may be further configured to train the first ML model 106 further based on the determined first output. The training of the first ML model 106 may involve a set of operations that are described, for example, at FIG. 6.

At 502G, a model output operation may be performed. In the model output operation, the system 102 may be configured to output (or deploy) the trained first ML model 106. The outputted first ML model 106 may be trained to assign the first label and the first value for each trace of the process. The first label and the first value for each trace may be associated with two or more activities of the process. As an example, the first ML model 106 may generate the first label and the first value to be associated with the inefficiencies between the "IT Support—America" state, and the "Resolved" state of the flow map 304 (shown in FIG. 3). In an embodiment, the sub-operations from 406A to 406D may be performed by the trained first ML model 106.

In an embodiment, the system 102 may be configured to output a set of hidden labels and a set of values for each of the set of hidden labels along with the trained ML model. The set of hidden labels may be generated based on the analysis of the identified events of interest, the reconstructed second set of records, the extracted first conversation, and the extracted second conversation. In another embodiment, the system 102 may be configured to assign a first hidden label, from the set of hidden labels, and a corresponding hidden value to each trace of the process, wherein the first hidden label and associated first hidden value may indicate information about a root cause for the determined state of inefficiency between corresponding activities of the process. For example, if a job or a ticket in the process may be re-assigned from one agent to another agent and thus may be creating the inefficiencies, the first hidden label that may be assigned to the trace associated with each re-assignment may be "Re-assignment Reason", and the first hidden value may be "Due to Worker Un-availability", or "Assigned by Mistake", or "Due to Escalation" or the like.

Figure 6:
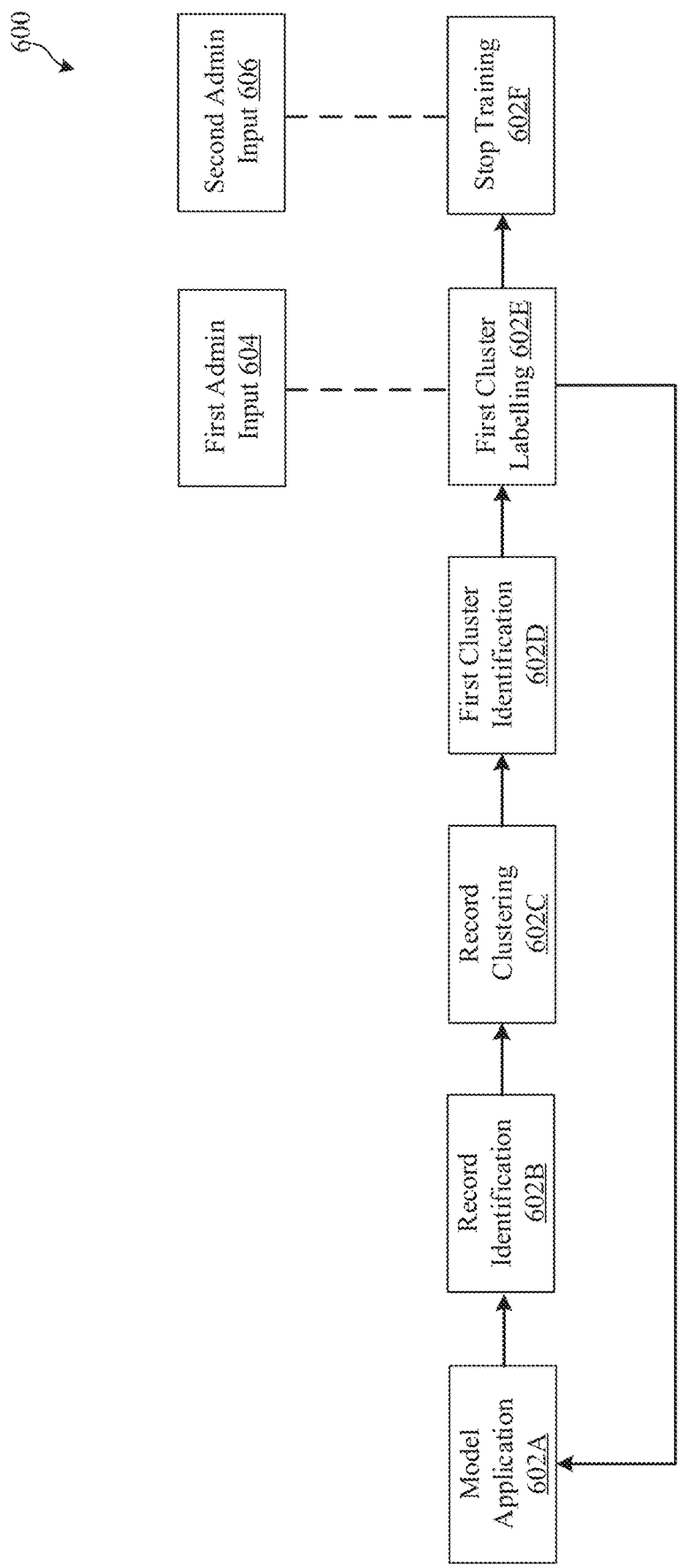
FIG. 6 depicts a block diagram that illustrates a second set of operations for training of a first ML model of FIG. 5, in accordance with an embodiment of the disclosure.

FIG. 6 depicts a block diagram that illustrates a second set of operations for training of the first ML model of FIG. 5, in accordance with an embodiment of the disclosure. FIG. 6 is explained in conjunction with elements from FIG. 1, FIG. 2, FIG. 3, FIG. 4, and FIG. 5. With reference to FIG. 6, there is shown a block diagram 600 of a set of exemplary operations from 602A to 602F. The exemplary operations illustrated in the block diagram 600 may be performed by any system, such as by the system 102 of FIG. 1 or by the processor 202 of FIG. 2.

At 602A, a model application operation may be performed. In the model application operation, the system 102 may be configured to apply the first ML model 106 on each trace of plurality of traces of the process in the training dataset. The first ML model 106 may be configured to assign a label (like root cause) and a first value to one or more traces of the set of training records. In a first instance, the first ML model 106 may randomly assign labels and values to one or more traces in the process. With re-training, an accuracy of the first ML model 106 may increase and hence the first ML model may assign (or associate) correct labels and values with each trace of the process. In the re-training of the first ML model 106, the system 102 may be configured to execute the operations from 602A to 602E until a second admin input 606 may be received. The system 102 may be configured to re-train the first ML model 106 on each trace of a plurality of traces of the process in the training dataset.

At 602B, a record identification operation may be performed. In the record identification operation, the system 102 may be configured to identify a third set of records. The system 102 may identify the third set of records from the second set of records. The identified third set of records may correspond to records that may be unclassified (i.e. or not mapped with any label related to root cause) to one or more traces related to activities or states in the process. Specifically, the system 102 may be configured to eliminate (or exclude) one or more records associated with the one or more traces from the set of training records, to identify the third set of records.

At 602C, a record clustering operation may be performed. In the record clustering operation, the system 102 may be configured to cluster or group one or more records of the identified third set of records, that may have similar values of one or more fields, into a set of clusters. Each cluster may include one or more records of the identified third set of records. Also, each of the identified third set of records may be a part of at most one cluster of the set of clusters.

At 602D, a first cluster identification operation may be performed. In the first cluster identification operation, the system 102 may be configured to detect a first cluster from the set of clusters. The first cluster may have a maximum density of records among the set of clusters. Each record in the first cluster may have similar values for most of the fields or attributes associated with the records in the first cluster.

At 602E, a first cluster labelling operation may be performed. In the first cluster labelling operation, the system 102 may be configured assign a label and a value to each record within the first cluster. In an embodiment, the system 102 may be configured to assign the label and the value (i.e. say assigned by the first ML model 106) to each record in the identified first cluster. The assigned label and the assigned value may be associated with the root cause of the inefficiencies in the process. For example, the first cluster may contain records (i.e. or traces) that may have many re-assignments between multiple agents and therefore may be inefficient. For such cluster, the assigned label by the administrator may be "Reassignment Reason", and the value may be, but is not limited to, "Error", "organic reassignment", "reassigning due to escalation". In an embodiment, one or more clusters may be assigned with same label, but each of such one or more clusters may have different values. For example, a first cluster, a second cluster, and a third cluster may have same label (say "Reassignment Reason"), but the value assigned to the first cluster may be "Error", the value assigned to the second cluster may be "organic reassignment", and the value assigned to the third cluster may be "reassigning due to escalation". In an embodiment, the assigned label and the assigned value may be correct. In such scenarios, the system 102 may proceed to 602F.

In an embodiment, the assigned label and the assigned value may not be correct. In such scenario, an administrator of the system 102 (or the user 112) may be required to manually correct the label and the value for certain records in the first cluster. The system 102 may be configured to receive a first admin input 604 from the administrator via an electronic device associated with the administrator or via the I/O device 206 (shown in FIG. 2) of the system 102. The first admin input 604 may include a label and a value to be assigned to the detected first cluster. Based on the reception of the first admin input 604, the system 102 may be configured to assign the label and the value to particular records (or to each record) present in the detected first cluster. Therefore, the disclosed system may also include human inputs (or keep humans in the loop) during the training of the first ML model 106 as the human may be able to assign a label and a value that may correctly define the root cause of the inefficiency at least in a first iteration of the training of the first ML model 106. It may be noted that as a count of iterations increases, an accuracy of the first ML model 106 in predicting the correct labels and values may also increase.

In an embodiment, the system 102 may be configured to perform the steps from 602A to 602E (or re-train the first ML model 106) until the second admin input 606 is received. The second admin input 606 may be associated with stopping the training of the first ML model 106. In an embodiment, the second admin input 606 may be received after the administrator is satisfied that the records are being assigned with correct labels and correct values by the first ML model 106. Until the administrator is not satisfied with the assigned labels and values, the system 102 may again perform the steps from 602A to 602E for the training or re-training of the first ML model 106. At 602F, the system 102 may be further configured to stop the training of the first ML model based on the reception of the second admin input 606.

Figure 7:
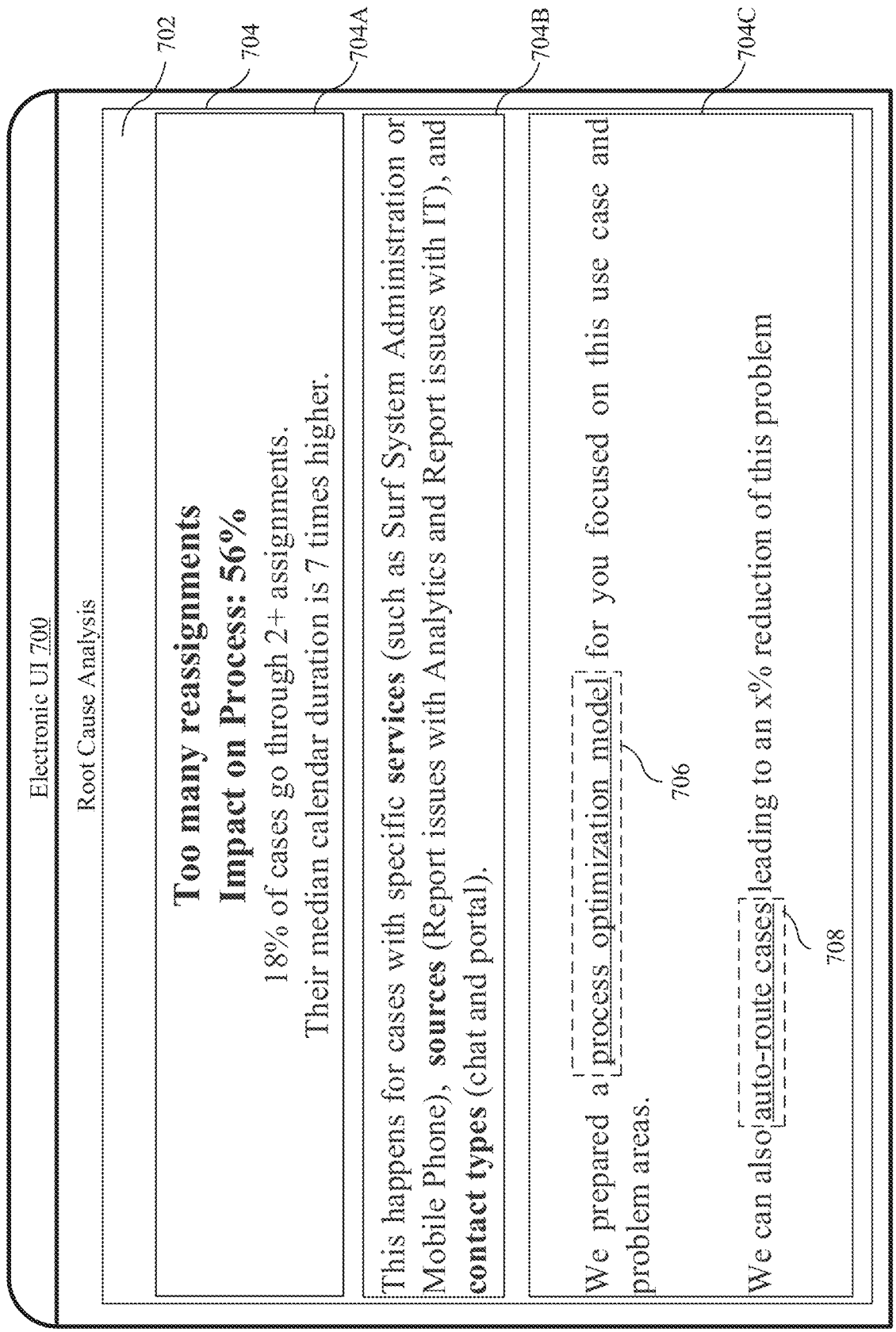
FIG. 7 is a diagram that displays an exemplary presentation data, in accordance with an embodiment of the disclosure.

FIG. 7 is a diagram that displays an exemplary presentation data, in accordance with an embodiment of the disclosure. FIG. 7 is described in conjunction with elements from FIGS. 1, 2, 3, 4, 5, and 6. With reference to FIG. 7, there is shown an exemplary electronic user interface (UI) 700. The exemplary electronic UI 700 may be displayed on the user device 104 associated with the user 112. With reference to FIG. 0.7, there is further shown presentation data 702 that may be displayed on the exemplary electronic UI 700.

The system 102 may be configured to receive the log data associated with first trace between the first activity and the second activity of the process. The system 102 may be further configured to determine the state of inefficiency between the first activity and the second activity based on the received log data. Based on the determination of the inefficiency, the system 102 may be configured to apply the first ML model 106 on the received log data. The system 102 may be further configured to determine the first label and the first value to be associated with the first trace of the process based on the application of the first ML model as described, for example, in FIG. 4. The first label and the first value may indicate information about the root cause for the determined state of inefficiency. The system 102 may be further configured to generate the presentation data 702 associated with the determined state of inefficiency of the first trace based on the determination of the first label and the first value and further transmit the generated presentation data 702 on the user device 104. The user device 104 may be configured to receive the presentation data 702 and further display the received presentation data 702 on the exemplary electronic UI 700 rendered on a display screen of the user device 104.

With reference to FIG. 7, there shown a first UI element 704 that may be divided into a set of sections (but not limited to) such as a first section 704A, a second section 704B, and a third section 704C. The first UI element 704 may be a textbox and the presentation data 702 may be displayed within the first UI element 704. In another embodiment, the generated presentation data 702 may further include one or more root causes for the determined state of inefficiency between the first activity and the second activity and an impact of the inefficiency on the process. In an embodiment, the one or more root causes and one or more metrics associated with the root causes may be displayed within the first section 704A of the first UI element 704. By way of example, the root cause for the state of inefficiency between the first activity and the second activity of the process may be due to "To many reassignments" of one or more records between the first activity and the second activity that may have 56% impact on the overall process. In an embodiment, the presentation data 702 may further include the one or more metrics associated with the determined root cause. For example, (with reference to FIG. 7) "18% of cases go through 2+ assignments." and "Their median calendar duration is 7 times higher." In an embodiment, the one or more metrics may be displayed based on a selection of each of the one or more metrics during the initialization of the system 102.

In an embodiment, information associated one or more fields with corresponding values may be a reason for the state of inefficiency between the first activity and the second activity. Such information may also be included in the generated presentation data 702 and may be displayed within the second section 704B of the first UI element 704 as shown, for example, in FIG. 7.

In an embodiment, the generated presentation data 702 may further include one or more suggestions to overcome the inefficiency between the first activity and the second activity in future. For example, the system 102 may be configured to generate a process optimization model that may provide one or more suggestions to overcome the inefficiency between the first activity and the second activity. The process optimization model may be viewed based on the selection of a second UI element 706 (for example a hyperlink). In an embodiment, the one or more suggestions may also be present within the presentation data 702 and may be displayed within the third section 704C of the first UI element 704 as shown, for example, in FIG. 7. In an embodiment, details about implementation of the one or more suggestions (such as "auto-route cases leading to an x % reduction of this problem") may be displayed based on selection of a third UI element 708 as shown, for example, in FIG. 7.

Figure 8:
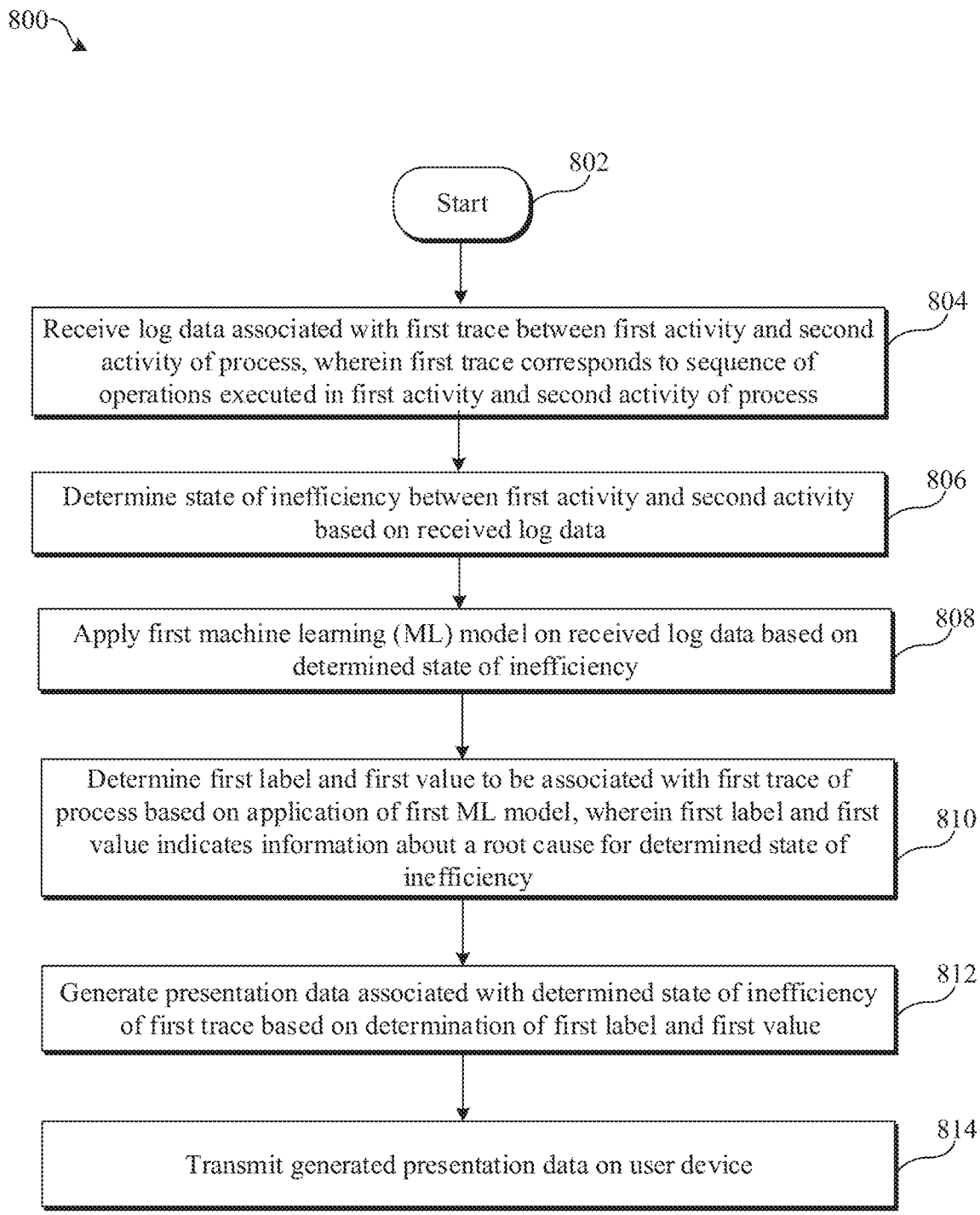
FIG. 8 is a flowchart that illustrates an exemplary method for root cause analysis based on process optimization data, in accordance with an embodiment of the disclosure.

FIG. 8 is a flowchart that illustrates an exemplary method for root cause analysis based on process optimization data, in accordance with an embodiment of the disclosure. FIG. 8 is described in conjunction with elements from FIGS. 1, 2, 3, 4, 5, 6, and 7. With reference to FIG. 8, there is shown a flowchart 800. The exemplary method of the flowchart 800 may be executed by any computing system, for example, by the system 102 of FIG. 1 or FIG. 2. The exemplary method of the flowchart 800 may start at 802 and proceed to 804.

At 804, the log data associated with the first trace between the first activity and the second activity of the process may be received. The first trace may correspond to the sequence of operations (or tasks) executed between the first activity and the second activity of the process. In one or more embodiments, the system 102 may be configured to receive the log data associated with the first trace between the first activity and the second activity of the process Details about the reception of the log data are provided, for example, in FIG. 1, FIG. 3, and FIG. 4 (at 402).

At 806, the state of inefficiency between the first activity and the second activity may be determined. The state of inefficiency may be determined based on the received log data. In one or more embodiments, the system 102 may be configured to determine the state of inefficiency between the first activity and the second activity based on the received log data. Details about the determination of the state of inefficiency are provided, for example, in FIG. 4 (at 404).

At 808, the first machine learning (ML) model 106 may be applied on the received log data. The first ML model may be applied based on the determined state of inefficiency. In one or more embodiments, the system 102 may be configured to apply the first ML model 106 on the received log data based on the determined state of inefficiency. Details about the application of the first ML model 106 are provided, for example, in FIG. 4 (at 406).

At 810, the first label and the first value to be associated with the first trace of the process may be determined. The first label and the first value may be determined based on the application of the first ML model 106. The first label and the first value may indicate information about the root cause for the determined state of inefficiency. In one or more embodiments, the system 102 may be configured to determine the first label and the first value to be associated with the first trace of the process based on the application of the first ML model. Details about the determination of the first label and the first value are provided, for example, in FIG. 4 (at 406) and FIG. 5.

At 812, the presentation data 114 associated with the determined state of inefficiency of the first trace may be generated. The presentation data 114 may be generated based on the determination of the first label and the first value. In one or more embodiments, the system 102 may be configured to generate the presentation data 114 associated with the determined state of inefficiency of the first trace based on the determination of the first label and the first value. Details about the presentation data 114 are provided, for example, in FIG. 7.

At 814, the generated presentation data 114 may be transmitted to the user device 104. In one or more embodiments, the system 102 may be configured to transmit the generated presentation data 114 on the user device 104. In some embodiments, the system 102 may control the user device 104 to render the generated presentation data 114 as shown, for example, in FIG. 7. Control may pass to end.

Although the flowchart 800 is illustrated as discrete operations, such as 804, 806, 808, 810, 812, and 814, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions executable by a machine and/or a computer to operate a computing system (e.g., the system 102) for root cause analysis based on process optimization data. The computer-executable instructions may cause the machine and/or computer to perform operations that include reception of log data associated with a first trace between a first activity and a second activity of a process. The first trace may correspond to a sequence of operations executed between the first activity and the second activity of the process. The operations further include determination of a state of inefficiency between the first activity and the second activity based on the received log data. The operations further include application of a first machine learning (ML) model (such as the first ML model 106) on the received log data based on the determined state of inefficiency. The operations may further include determination of a first label and a first value to be associated with the first trace of the process based on the application of the first ML model. The first label and the first value may indicate information about a root cause for the determined state of inefficiency. The operations may further include generation of presentation data (such as the presentation data 114) associated with the determined state of inefficiency of the first trace based on the determination of the first label and the first value. The operations may further include transmission of the generated presentation data on a user device (such as the user device 104).

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively, or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long-term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures. While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed:

1. A method comprising:
   capturing log data indicating a sequence of operations executed between a first activity of a process and a second activity of the process;
   detecting an inefficiency between a first user input associated with the first activity and a second user input associated with the second activity, based on a plurality of criteria and the log data, wherein the inefficiency corresponds to an additional time period between first user input associated with the first activity and the second user input associated with the second activity;
   in response to detecting the inefficiency, generating, using a machine learning (ML) model and the log data, an output to be associated with the sequence of operations;
   determining, using the output, a root cause of the inefficiency between the first activity and the second activity; and
   generating presentation data indicating the root cause.

2. The method of claim 1, wherein the plurality of criteria reflect a process loop state for the process, wherein the process loop state corresponds to the inefficiency between the first activity and the second activity.

3. The method of claim 2, wherein the process loop state reflects a time period indicative of the inefficiency between the first activity and the second activity.

4. The method of claim 2, wherein the process loop state is determined based on a loop count.

5. The method of claim 1, wherein the sequence of operations is between the first activity and the second activity.

6. The method of claim 1, wherein the plurality of criteria reflect a process loop state for the process, wherein the process loop state indicates that the process returns to the first activity.

7. The method of claim 6, wherein the process loop state indicates the inefficiency between the first activity and the second activity of the process.

8. The method of claim 1, wherein the plurality of criteria reflect a process loop state for the process, wherein the process loop state indicates that the process returns to the first activity after the second activity.

9. The method of claim 8, wherein the process loop state indicates the inefficiency between the first activity and the second activity of the process.

10. A non-transitory computer-readable storage medium configured to store instructions that, in response to being executed by one or more processors, causes a system to:
    capture log data indicating a sequence of operations executed between a first activity of a process and a second activity of the process;
    detect an inefficiency between a first user input associated with the first activity and a second user input associated with the second activity, based on a plurality of criteria and the log data, wherein the inefficiency corresponds to an additional time period between first user input associated with the first activity and the second user input associated with the second activity;
    in response to detecting the inefficiency, generate, using a machine learning (ML) model and the log data, an output to be associated with the sequence of operations;
    determine, using the output, a root cause of the inefficiency between the first activity and the second activity; and
    generate presentation data indicating the root cause.

11. The non-transitory computer-readable storage medium of claim 10, wherein the plurality of criteria reflect a process loop state for the process, wherein the process loop state corresponds to the inefficiency between the first activity and the second activity.

12. The non-transitory computer-readable storage medium of claim 11, wherein the process loop state reflects a time period indicative of the inefficiency between the first activity and the second activity.

13. The non-transitory computer-readable storage medium of claim 11, wherein the process loop state is determined based on a loop count.

14. The non-transitory computer-readable storage medium of claim 10, wherein the sequence of operations is between the first activity and the second activity.

15. The non-transitory computer-readable storage medium of claim 10, wherein the plurality of criteria reflect a process loop state for the process, wherein the process loop state indicates that the process returns to the first activity.

16. The non-transitory computer-readable storage medium of claim 15, wherein the process loop state indicates the inefficiency between the first activity and the second activity of the process.

17. The non-transitory computer-readable storage medium of claim 10, wherein the plurality of criteria reflect a process loop state for the process, wherein the process loop state indicates that the process returns to the first activity after the second activity.

18. The non-transitory computer-readable storage medium of claim 17, wherein the process loop state indicates the inefficiency between the first activity and the second activity of the process.

19. A system, comprising:
   a processor configured to:
      capture log data indicating a sequence of operations executed between a first activity of a process and a second activity of the process;
      detect an inefficiency between a first user input associated with the first activity and a second user input associated with the second activity, based on a plurality of criteria and the log data, wherein the inefficiency corresponds to an additional time period between first user input associated with the first activity and the second user input associated with the second activity;
      in response to detecting the inefficiency, generate, using a machine learning (ML) model and the log data, an output to be associated with the sequence of operations;
      determine, using the output, a root cause of the inefficiency between the first activity and the second activity; and
      generate presentation data indicating the root cause.

20. The system of claim 19, wherein the plurality of criteria reflect a process loop state for the process, wherein the process loop state corresponds to the inefficiency between the first activity and the second activity.

\* \* \* \* \*